United States Patent
Zhang et al.

(10) Patent No.: US 11,665,598 B2
(45) Date of Patent: May 30, 2023

(54) METHOD FOR BATCH HANDOVER AUTHENTICATION AND KEY AGREEMENT ORIENTED TO HETEROGENEOUS NETWORK

(71) Applicant: Southwest Jiaotong University, Chengdu (CN)

(72) Inventors: Wenfang Zhang, Chengdu (CN); Xiaomin Wang, Chengdu (CN); Dan Chen, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 10 days.

(21) Appl. No.: 17/359,664

(22) Filed: Jun. 28, 2021

(65) Prior Publication Data

US 2022/0030473 A1     Jan. 27, 2022

(30) Foreign Application Priority Data

Jul. 27, 2020   (CN) .......................... 202010733277.0

(51) Int. Cl.
| | |
|---|---|
| *H04W 36/00* | (2009.01) |
| *H04W 12/75* | (2021.01) |
| *H04L 9/40* | (2022.01) |
| *H04W 12/06* | (2021.01) |
| *H04W 84/12* | (2009.01) |

(52) U.S. Cl.
CPC ..... *H04W 36/0027* (2013.01); *H04L 63/0892* (2013.01); *H04W 12/06* (2013.01); *H04W 12/75* (2021.01); *H04W 36/0038* (2013.01); *H04W 84/12* (2013.01)

(58) Field of Classification Search
CPC . H04W 36/0027; H04W 12/06; H04W 12/75; H04W 36/0038; H04W 84/12; H04W 36/0022; H04W 12/106; H04L 63/0892; H04L 9/3242; H04L 2209/80
See application file for complete search history.

(56) References Cited

U.S. PATENT DOCUMENTS

| | | | |
|---|---|---|---|
| 2017/0264606 A1* | 9/2017 | Forssell | ............... H04L 63/0281 |
| 2018/0115942 A1* | 4/2018 | Targali | .................. H04W 12/35 |
| 2020/0322852 A1* | 10/2020 | Mohamed | ......... H04W 36/0011 |

\* cited by examiner

*Primary Examiner* — Jung H Park
(74) *Attorney, Agent, or Firm* — Bayramoglu Law Offices LLC (57) ABSTRACT

A method for batch handover authentication and key agreement oriented to a heterogeneous network generally includes the following steps: A, system establishment and participant registration: users participating in authentication register on the LTE-A network to obtain their respective identity information; B, access authentication: when a large number of users request access to the WLAN, the target network WLAN is discovered by using the ANDSF, and the leader sends a complete group authentication message to the AAA server of the WLAN to request identity authentication; if the authentication succeeds, the AAA server of the WLAN returns an identity authentication response; C, if the authentication fails, the continued execution of the protocol is terminated. The method effectively realizes batch authentication of users during handover from the LTE-A network to the WLAN, and thus has high authentication efficiency, small signaling overheads, and high security.

8 Claims, 1 Drawing Sheet

METHOD FOR BATCH HANDOVER AUTHENTICATION AND KEY AGREEMENT ORIENTED TO HETEROGENEOUS NETWORK

CROSS REFERENCE TO THE RELATED APPLICATIONS

This application is based upon and claims priority to Chinese Patent Application No. 202010733277.0, filed on Jul. 27, 2020, the entire contents of which are incorporated herein by reference.

TECHNICAL FIELD

The present invention belongs to the technical field of long term evolution-advanced (LTE-A) and wireless local area network (WLAN) integrated heterogeneous networks, and in particular, relates to a method for batch handover authentication and key agreement oriented to a heterogeneous network.

BACKGROUND

In the past several years, with the increasing use of mobile devices, users have increasing demands for real-time and stable wireless networks, not only requiring basic communication services, but also desiring to enjoy rich multimedia services such as online games and videos. With the advent of the 5G era, a new generation of wireless communication systems will be integrated with different wireless access technologies to support secure and seamless handover of user equipment, as well as applications and services with different quality of service (QoS) requirements. An integrated heterogeneous network includes nodes with different transmission power and coverage. High power nodes (HPNs) cover a wide area, and thus are typically deployed in cities, suburbs, and rural areas to provide full coverage. Low power nodes (LPNs), on the other hand, are typically deployed in railway stations and libraries to achieve small-area coverage, thereby improving system capacity and network throughput. The HPN and LPN integrated heterogeneous networks are capable of achieving greater network capacity and coverage. Therefore, as the most widely used technology and standard, a typical heterogeneous network architecture integrated with a $3^{rd}$ generation partnership project (3GPP) LTE-A network (providing HPNs) and a WLAN (providing LPNs) can support high-quality data services for a lot of user equipment. In this case, users inevitably face the problem of handover between LTE-A and WLAN heterogeneous networks. In order to ensure the security of wireless communication, it is necessary to carry out secure identity authentication and key agreement.

The present invention provides an LTE-A and WLAN integrated heterogeneous network architecture, where the service gateway (S-GW) supports 3GPP access connection, and has the function of mobile access gateway (MAG) for IP mobility management. The access gateway (A-GW) supports non-3GPP access connection, and serves as an MAG in trusted non-3GPP access. The packet data network gateway (PDN GW) is responsible for allocating IP addresses to user equipment, while serving as a local mobility anchor (LMA) between 3GPP and non-3GPP access networks to manage the binding and revocation status of the user equipment. The discovery function module ANDSF supports the discovery and selection of 3GPP and non-3GPP access networks as a trusted third party in the seamless handover process of heterogeneous networks. The user equipment sends key information such as its identity and location to the discovery function module ANDSF via the S14 interface to request target access network detection. The discovery function module ANDSF defined in 3GPP provides necessary auxiliary functions such as network discovery and selection for the inter-system handover of heterogeneous networks, that is, sending relevant available target access network information and inter-system mobility policies of the operator to the user equipment as a response to the access network information. The authentication, authorization, and accounting (AAA) server is responsible for authenticating the user equipment and authorizing legitimate equipment to access the network. The current access authentication protocol process has the following problems:

(1) It is not suitable for large-scale group access authentication. Due to the fact that in the heterogeneous network architecture, users are not clear about the mobile access gateway-related access policies of the target access network. In this case, if each user uses the discovery function module ANDSF to request to access gateway information alone, it will not only cause serious network congestion, but also consume substantial network resources, and the computation and communication overheads will increase exponentially as a result.

(2) The security level is low. In a heterogeneous network, the related signals are transmitted via an open air interface. In this process, the protocol fails to provide privacy protection and thus is vulnerable to various malicious attacks such as impersonation, man-in-the-middle attacks, replay attacks, and redirection attacks. Moreover, the session key agreed between the target access network and the user lacks forward/backward security. In this case, once the session key is leaked, confidential information will be leaked, making the entire communication process no longer secure.

SUMMARY

In view of the above-mentioned shortcomings in the prior art, the present invention provides a method for batch handover authentication and key agreement oriented to a heterogeneous network. The method is capable of effectively realizing secure and fast handover from the LTE-A network to the WLAN among a large number of users to realize batch handover authentication while greatly reducing the system overhead, thereby providing a strong security guarantee for users under wireless communication.

In order to achieve the above-mentioned objective, the present invention adopts the following technical solutions.

A method for batch handover authentication and key agreement oriented to a heterogeneous network includes the following steps:

S1, system establishment and participant registration: establishing a system, and allowing users authenticated by a plurality of participants to register on an LTE-A network to obtain their respective identity information;

S2, access authentication: taking an equipment with computing capacity superior to storage capacity as a leader, discovering a target access network WLAN by using a discovery function module ADNSF, sending, by the leader, complete group authentication information to an authentication, authorization, and accounting (AAA) server of the WLAN to authenticate identity information of each participant, determining whether the identity information is successfully authenticated, and if yes, returning an identity authentication response by the AAA server of the WLAN to complete the batch handover authentication and the key agreement, otherwise, entering step S3; and S3, if the authentication fails, terminating the execution to complete the batch handover authentication and the key agreement.

Further, step S2 includes the following steps:

S201, taking the equipment with computing capacity superior to storage capacity as the leader;

S202, computing, by a user equipment $UE_i$, a message authentication code $MAC_{i/ANDSF}$ of the user equipment $UE_i$ according to a personal temporary identity $TID_i$ and a group temporary identity $TID_{G1}$, and sending the message authentication code $MAC_{i/ANDSF}$, the personal temporary identity $TID_i$ and the group temporary identity $TID_{G1}$ to the leader; wherein the message authentication code $MAC_{i/ANDSF}$ is expressed as:

$$MAC_{i/ANDSF}=H(SK_{i/ANDSF}, TID_i \| TID_{G1});$$

wherein H represents a hash function, $SK_{i\text{-}ANDSF}$ represents a shared key of the user equipment $UE_i$ and the discovery function module ANDSF;

S203, aggregating the message authentication code $MAC_i$ of the user equipment $UE_i$ by the leader, obtaining an address of the nearby discovery function module ANDSF by using a domain name server DNS, and performing integrity protection by using a random number $N_{LD}$ encrypted and generated by a symmetric key $SK_{LD\text{-}ANDSF}$ and uniquely determined location information $L_{LD}$, route identifier $ID_{route}$ and message authentication code $MAC_{G1/ANDSF}$, and sending the random number $N_{LD}$ and the uniquely determined location information $L_{LD}$, route identifier $ID_{route}$ and message authentication code $MAC_{G1/ANDSF}$ as an information request of the access network to the discovery function module ANDSF;

S204, according to the information request of the access network, verifying the identity information of the user equipment $UE_i$ in batches by using the message authentication code $MAC_{G1/ANDSF}$, and determining whether there is an illegitimate user equipment $UE_i$, if yes, entering step S3, otherwise, returning the identity authentication response by the AAA server of the WLAN, and entering step S205;

S205, selecting a target access network AAA by using the discovery function module ANDSF based on a preset access network priority strategy, computing parameter information used by a server $AAA_{WLAN}$ of the target access network AAA for authenticating the user equipment $UE_i$, encrypting random numbers $N_{ANDSF}$ and $N_{LD}$ by using a symmetric key $K_{ANDSF\text{-}AAA}$, computing a local identity, a temporary key and an access node identifier $ID_{NAP}$ of the target access network of the user equipment $UE_i$, respectively, computing a message authentication code $MAC_{ANDSF/AAA}$ in combination with the parameter information of the user equipment $UE_i$, and sending the message authentication code $MAC_{ANDSF/AAA}$ to the server $AAA_{WLAN}$ of the target access network AAA;

S206, computing a message authentication code $XMAC_{ANDSF/AAA}$ by the server $AAA_{WLAN}$ of the target access network AAA, and determining whether the message authentication code $XMAC_{ANDSF/AAA}$ has passed a verification by the server $AAA_{WLAN}$ of the target access network AAA together with the message authentication code $MAC_{ANDSF/AAA}$ from the ANDSF, if yes, entering step S207, otherwise, terminating a protocol and entering step S3;

S207, selecting a random number $N_{AAA}$ by the server $AAA_{WLAN}$ of the target access network AAA, computing a session key corresponding to the user equipment $UE_i$ one-to-one, and obtaining a message authentication code $MAC_{AAA/ANDSF}$ by performing encryption protection on the random number $N_{AAA}$ using the symmetric key $K_{ANDSF\text{-}AAA}$ according to the corresponding session key, and sending the message authentication code $MAC_{AAA/ANDSF}$ to the discovery function module ANDSF;

S208, computing a message authentication code $XMAC_{AAA/ANDSF}$ according the random number $N_{AAA}$ and the symmetric key $K_{ANDSF\text{-}AAA}$, comparing the message authentication code $MAC_{AAA/ANDSF}$ with the message authentication code $XMAC_{AAA/ANDSF}$, verifying message integrity and identity information of the server $AAA_{WLAN}$ of the target access network AAA according to the comparison result, encrypting the random numbers $N_{AAA}$ and $N_{LD}$, the access node identifier $ID_{NAP}$ of the target access network and a timestamp $T_{ANDSF}$ by using a group temporary key $GTK_{G1}$, computing a message authentication code $MAC_{ANDSF/G1}$ according to the group temporary key $GTK_{G1}$, the random numbers $N_{AAA}$, $N_{LD}$ and the timestamp $T_{ANDSF}$, and sending an access network selection decision to the leader;

S209, decrypting the message and checking the random number $N_{LD}$ by using the group temporary key $GTK_{G1}$, verifying the integrity of the message received in S208 and authenticating a message source according to the message authentication code $MAC_{ANDSF/G1}$, and determining whether the message source is successfully authenticated, if yes, broadcasting, by the leader, a message of the access network selection decision to other user equipment $UE_i$, and entering step S2010, otherwise, terminating the protocol and entering step S3; wherein the message authentication code $MAC_{ANDSF/G1}$ is expressed as:

$$MAC_{ANDSF/G1}=H(GTK_{G1}, LID_{G1}\|N_{AAA}\|N_{LD}\|ID_{NAP}\|T_{ANDSF});$$

wherein $GTK_{G1}$ represents the group temporary key, $ID_{NAP}$ represents the access node identifier of the target access network, $N_{LD}$ represents a random number of the leader, $N_{AAA}$ represents a random number selected by the server of the target access network AAA, $LID_{G1}$ represents a local identity identifier of a user group/equipment UE, and $T_{ANDSF}$ represents the timestamp at which the discovery function module ANDSF sends the message;

S2010, verifying the decrypted message by the user equipment $UE_i$, computing a session key $SK_{iAAA}$ shared with the server $AAA_{WLAN}$ of the target access network AAA according to the verification result, computing the local personal identity $LID_i$ and the local group identity $LID_{G1}$ for the users to access the target access network, and a personal temporary key $TK_i$ for generating a session between the user equipment $UE_i$ and the server $AAA_{WLAN}$ of the target access network AAA, computing a new temporary key $TK_{G1}$ and a message authentication code $MAC_{i/LD}$ according to a preset shared key, and sending a handover request message to the leader by using the new temporary key $TK_{G1}$ and the message authentication code $MAC_{i/LD}$;

S2011, collecting and verifying, by the leader, the handover request information of the user equipment $UE_i$, performing encryption protection on a newly generated random number $N_{LD2}$ by using a symmetric key $SK_{LD\text{-}S\text{-}GW}$, computing a corresponding message authentication code $MAC_{LD/S\text{-}GW}$ in combination with the timestamp $T_{LD}$, generating an identity authentication ticket TicP-GW for a service gateway S-GW by using the message authentication code $MAC_{LD/S\text{-}GW}$, and sending the handover information to the service gateway S-GW via a base station eNodeB;

S2012, decrypting the information by the service gateway S-GW to obtain the random number $N_{LD2}$, computing a message authentication code $XMAC_{LD/S-GW}$ according to the random number $N_{LD2}$, comparing the message authentication code $XMAC_{LD/S-GW}$ with the received message authentication code $MAC_{LD/S-GW}$, and determining whether the two values are equal, if yes, the authentication is successful, and entering step S2013, otherwise, repeating step S2012;

S2013, computing a message authentication code $MAC_{S-GW/P-GW}$ according to the random number $N_{LD2}$, and forwarding the message authentication code $MAC_{S-GW/P-GW}$ together with the identity authentication ticket Tic P-GW as a fast proxy binding update request to a packet gateway P-GW; wherein the message authentication code $MAC_{S-GW/P-GW}$ is expressed as:

$$MAC_{S-GW/P-GW} = H(K_{S-GW-P-GW}, N_{LD2});$$

wherein $K_{S-GW-P-GW}$ represents the shared key of the service gateway S-GW and the packet gateway P-GW;

S2014, decrypting the identity authentication ticket Tic P-GW by the packet gateway P-GW, generating a message authentication code $XMAC_{S-GW/P-GW}$ according to the random number $N_{LD2}$, comparing the message authentication code $XMAC_{S-GW/P-GW}$ with the message authentication code $MAC_{S-GW/P-GW}$ from the service gateway S-GW, and determining whether the two values are equal, if yes, determining that the service gateway S-GW is a legitimate node authorized by the user equipment $UE_i$, computing the message authentication code $MAC_{P-GW/S-GW}$ by the packet gateway P-GW according to the random number $N_{LD2}$, sending the message authentication code $MAC_{P-GW/S-GW}$ as a fast proxy binding acknowledgment message to the service gateway S-GW, and entering step S2015, otherwise, terminating the protocol and entering step S3;

S2015, buffering, by the packet gateway P-GW, data packets of the user equipment $UE_i$ into a database of the packet gateway P-GW, and receiving returned data packets;

S2016, encrypting, by the packet gateway P-GW using the symmetric key $K_{P-GW-A-GW}$, a generated random number $N_{P-GW}$ and the local identity $LID_i$ of all user equipment $UE_i$, and computing a corresponding message authentication code $MAC_{P-GW/A-GW}$; wherein the message authentication code $MAC_{P-GW/A-GW}$ is expressed as:

$$MAC_{P-GW/A-GW} = H(K_{P-GW-A-GW}, LID_{(1-n)} \| LID_{G1} \| N_{P-GW});$$

wherein H represents a hash function, $K_{P-GW-A-GW}$ represents the shared key of the packet gateway P-GW and a gateway A-GW, $LID_{(1-n)}$ represents local identities of n users contained in a G1 group for identity authentication when accessing the WLAN, $LID_{G1}$ represents a group local identity, and $N_{P-GW}$ represents a random number;

S2017, sending the cipher text and the message authentication code $MAC_{P-GW/A-GW}$ obtained in step S2016 as a handover packet forwarding address request message to the gateway A-GW, obtaining a proxy care-of address CoA of the gateway A-GW, and allocating a temporary IP address to the user equipment $UE_i$ by using the proxy care-of address CoA;

S2018, decrypting the forwarding address request message by using the gateway A-GW to generate a message authentication code $XMAC_{P-GW/A-GW}$, and authenticating the packet gateway P-GW and checking message integrity by using the message authentication code $XMAC_{P-GW/A-GW}$;

S2019, determining whether the authentication is successful, wherein if yes, the gateway A-GW selects a random number $N_{A-GW}$, uses the shared key $K_{P-GW-A-GW}$ of the packet gateway P-GW and the gateway A-GW to encrypt the random number $N_{A-GW}$ and the proxy care-of address CoA, computes a message authentication code $MAC_{A-GW/P-GW}$, and sends the encrypted cipher text and the corresponding message authentication code $MAC_{A-GW/P-GW}$ as a response to a handover packet forwarding address request HPAR message to the packet gateway P-GW, and entering step S2020, otherwise, terminating the protocol and entering step S3;

the message authentication code $MAC_{A-GW/P-GW}$ is expressed as:

$$MAC_{A-GW/P-GW} = H(K_{P-GW-A-GW}, \text{Proxy-CoAA-GW} \| N_{A-GW});$$

wherein Proxy-CoAA-GW represents the proxy care-of address of the gateway A-GW, H represents a hash function, $K_{P-GW-A-GW}$ represents the shared key of the packet gateway P-GW and the gateway A-GW, and $N_{A-GW}$ represents a random number;

S2020, decrypting the handover packet forwarding address request HPAR message by the packet gateway P-GW to obtain the proxy care-of address CoA and the random number $N_{A-GW}$ of the gateway A-GW, computing the message authentication code $XMAC_{A-GW/P-GW}$ by obtaining the proxy care-of address CoA, comparing the message authentication code $XMAC_{A-GW/P-GW}$ with the $MAC_{A-GW/P-GW}$, and determining whether an authenticated identity of the gateway A-GW is legitimate according to the comparison result, if yes, computing the message authentication code $MAC_{P-GW/A-GW}$ according to the random number $N_{A-GW}$, and sending the message authentication code $MAC_{P-GW/A-GW}$ as a fast proxy binding update FPBU message to the gateway A-GW to establish a connection, and entering step S2021, otherwise, terminating the protocol and entering step S3;

S2021, computing a message authentication code $XMAC_{P-GW/A-GW}$ by using the random number $N_{A-GW}$ to authenticate the packet gateway P-GW, computing the message authentication code $MAC_{A-GW/P-GW}$ by using the random numbers $N_{A-GW}$ and $N_{P-GW}$, and sending the message authentication code $MAC_{A-GW/P-GW}$ as a fast proxy binding acknowledgment message to the packet gateway P-GW to indicate that the connection is established successfully;

S2022, disconnecting the user equipment $UE_i$ from a current base station, and connecting the user equipment $UE_i$ to a WLAN access node IDNAP;

S2023, collecting and aggregating, by the leader, the message authentication code $MAC_i$ into $MAC_{G1}$, and sending the $MAC_{G1}$ to the server $AAA_{WLAN}$ of the target access network AAA via the WLAN access gateway A-GW;

S2024, determining whether the server $AAA_{WLAN}$ of the target access network AAA has successfully verified the received message, if yes, returning a response message $MAC_2$ and entering step S2025; otherwise, ignoring the message and entering step 2025;

S2025, forwarding the buffered data packets by the service gateway P-GW during a handover process of the user equipment UE; and S2026, when all the buffered data packets are forwarded to the user equipment $UE_i$, creating a proxy mobile IPv6 (PMIPv6) tunnel between the packet gateway P-GW and the access gateway A-GW to complete access to authentication.

Furthermore, step S205 includes the following steps:

S2051, selecting the target access network AAA by the discovery function module ANDSF based on the preset access network priority strategy;

S2052, computing a personal local identity and a group local identity for authenticating the user equipment $UE_i$ for the server $AAA_{WLAN}$ of the target access network AAA, computing a personal temporary key for generating a session key of the user equipment $UE_i$ and the server $AAA_{WLAN}$ of the target access network AAA according to the personal local identity, and computing a new temporary key by using a pre-shared key according to the group local identity; wherein the personal local identity $LID_i$ is expressed as:

$$LID_i = TID_i \oplus H(N_{LD}, SK_{i\text{-}ANDSF});$$

wherein $TID_i$ represents the personal temporary identity, $\oplus$ represents an exclusive OR operation, and $SK_{i\text{-}ANDSF}$ represents the shared key of the user equipment $UE_i$ and the discovery function module ANDSF;

the group local identity $LID_{G1}$ is expressed as:

$$LID_{G1} = TID_{G1} \oplus H(N_{LD}, GTK_{G1});$$

wherein $TID_{G1}$ represents the group temporary identity, and $GTK_{G1}$ represents the shared key of the G1 group;

the personal temporary key $TK_i$ is expressed as:

$$TK_i = H(SK_{i\text{-}ANDSF} \| N_{LD} \| LID_i)$$

$$i = 1, 2, 3, \ldots, n;$$

the new temporary key $TK_{G1}$ is expressed as:

$$TK_{G1} = H(GTK_{G1} \| N_{LD} \| LID_{G1});$$

wherein H represents a hash function, $SK_{i\text{-}ANDSF}$ represents the shared key of the user equipment $UE_i$ and the discovery function module ANDSF, $N_{LD}$ represents a random number, $LID_i$ represents the local personal identity, i represents an $n^{th}$ user serial number, and $GTK_{G1}$ represents the shared key of the G1 group;

S2053, encrypting the random numbers $N_{ANDSF}$ and $N_{LD}$ by using the symmetric key $K_{ANDSF\text{-}AAA}$, and computing the local identity, the temporary key and the access node identifier $ID_{NAP}$ of the target access network for the user equipment $UE_i$;

S2054, computing the message authentication code $MAC_{ANDSF/AAA}$ according to the random numbers $N_{ANDSF}$ and $N_{LD}$, the group local identity, the new temporary key, and the access node identifier $ID_{NAP}$ of the target access network, and sending the message authentication code $MAC_{ANDSF/AAA}$ to the server $AAA_{WLAN}$ of the target access network AAA;

the message authentication code $MAC_{ANDSF/AAA}$ is expressed as:

$$MAC_{ANDSF/AAA} = H(K_{ANDSF\text{-}AAA}, ID_{ANDSF}, \\ \|T_{ANDSF}\|N_{ANDSF}\|N_{LD}\|TK_{(1\text{-}n)}\|TK_{G1}\|LID_{(1\text{-}n)} \\ \|LID_{G1}\|ID_{NAP});$$

wherein H represents a hash function, $T_{ANDSF}$ represents a timestamp at which the discovery function module ANDSF sends a message, $TK_{(1\text{-}n)}$ represents the personal temporary key, $TK_{G1}$ represents the temporary key shared by the G1 group, $LID_{G1}$ represents the local identity of the G1 group, $ID_{NAP}$ represents an access identifier of the target network, $ID_{ANDSF}$ represents an identity identifier of the ANDSF, and $LID_{(1\text{-}n)}$ represents the local personal identity of the $(1\text{-}n)^{th}$ user serial number.

Furthermore, in step S208, the message authentication code $XMAC_{AAA/ANDSF}$ is expressed as:

$$XMAC_{AAA/ANDSF} = H(K_{ANDSF\text{-}AAA}, ID_{AAA} \| T_{AAA} \\ \|N_{AAA}\|N_{ANDSF});$$

wherein $XMAC_{AAA/ANDSF}$ represents a message authentication code sent by the target access network AAA to the ANDSF, $ID_{AAA}$ represents an identity identifier of the target access network AAA, $T_{AAA}$ represents the timestamp at which the target access network AAA sends the message, and $N_{ANDSF}$ represents a random number of the discovery function module ANDSF;

the message authentication code $MAC_{ANDSF/G1}$ is expressed as:

$$MAC_{ANDSF/G1} = H(GTK_{G1}, \\ LID_{G1}\|N_{AAA}\|N_{LD}\|ID_{NAP}\|T_{ANDSF});$$

wherein $MAC_{ANDSF/G1}$ represents a message authentication code sent by the discovery function module ANDSF to the G1 group, $GTK_{G1}$ represents the group temporary key, $ID_{NAP}$ represents the access node identifier of the target access network, $LID_{G1}$ represents the local identity of the G1 group, and $T_{ANDSF}$ represents the timestamp.

Furthermore, in step S2010, the message authentication code $MAC_{i/LD}$ is expressed as:

$$MAC_{i/LD} = H(TK_{G1}, LID_i \| LID_{G1} \| T_i);$$

wherein $TK_{G1}$ represents the new temporary key, and $T_i$ represents the timestamp at which each UE sends the message;

the session key $SK_{iAAA}$ is expressed as:

$$SK_{iAAA} = H(TK_i \| N_{AAA} \| N_{LD});$$

wherein $TK_i$ represents the personal temporary key, and both $N_{LD}$ and $N_{AAA}$ represent random numbers;

the local personal identity $LID_i$ is expressed as:

$$LID_i = TID_i \oplus (N_{LD}, SK_{i\text{-}ANDSF});$$

wherein $SK_{i\text{-}ANDSF}$ represents the shared key of the user equipment $UE_i$ and the discovery function module ANDSF, $TID_i$ represents the personal temporary identity, $N_{LD}$ represents a random number, and $SK_{i\text{-}ANDSF}$ represents the pre-shared key of the user equipment $UE_i$ and the discovery function module ANDSF;

the local group identity $LID_{G1}$ is expressed as:

$$LID_{G1} TID_{G1} \oplus H(N_{LD}, GTK_{G1});$$

wherein $GTK_{G1}$ represents the shared key of the G1 group, $N_{LD}$ represents a random number, and H represents a hash function;

the personal temporary key $TK_i$ is expressed as:

$$TK_i = H(SK_{i\text{-}ANDSF} \| N_{LD} \| LID_i);$$

wherein H represents a hash function, $SK_{i\text{-}ANDSF}$ represents the shared key of the user equipment $UE_i$ and the discovery function module ANDSF, $N_{LD}$ represents a random number, and $LID_i$ represents the local personal identity;

the new temporary key $TK_{G1}$ is expressed as:

$$TK_{G1} = H(GTK_{G1} \| N_{LD} \| LID_{G1});$$

wherein $GTK_{G1}$ represents the shared key of the G1 group, $N_{LD}$ represents a random number, and $LID_{G1}$ represents the local identity of the G1 group;

the message authentication code $MAC_{i/LD}$ is expressed as:

$$MAC_{i/LD} = H(TK_{G1}, LID_i \| LID_{G1} \| T_i);$$

wherein $TK_{G1}$ represents the temporary key for users in the whole G1 group to access the WLAN, $LID_i$ represents the local identity of the user equipment $UE_i$, $LID_{G1}$ represents the local identity of the G1 group, and $T_i$ represents the timestamp at which each UE sends the message.

Furthermore, in step S2011, the message authentication code $MAC_{LD/S-GW}$ is expressed as:

$$MAC_{LD/S-GW} = H(SK_{LD-S-GW}, T_{LD} \| N_{LD2});$$

the identity authentication ticket TicP-GW is expressed as:

$$Tic\ P\text{-}GW = \{LID_{(1-n)} \| LID_{G1} \| T_{LD} \| N_{LD2} \| ID_{NAP} \| H(LID_{(1-n)} \| LID_{G1} \| T_{LD} \| N_{LD2} \| ID_{NAP})\} SK_{LD\text{-}P\text{-}GW};$$

wherein $ID_{NAP}$ represents the access node identifier of the target access network, $SK_{LD-P-GW}$ represents the pre-shared key of the leader and the packet gateway P-GW, $T_{LD}$ represents the timestamp, $N_{LD2}$ represents the newly generated random number, $LID_{(1-n)}$ represents the local personal identity of the $(1-n)^{th}$ user serial number, $LID_{G1}$ represents the local identity of the G1 group, and $T_{LD}$ represents the timestamp.

Furthermore, in step S2014, the message authentication code $MAC_{P-GW/S-GW}$ is expressed as:

$$MAC_{P-GW/S-GW} = H(K_{S-GW-P-GW}, N_{LD2}+1);$$

the message authentication code $XMAC_{S-GW/P-GW}$ is expressed as:

$$XMAC_{S-GW/P-GW} = H(K_{S-GW-P-GW}, N_{LD2});$$

wherein H represents a hash function, $K_{S-GW-P-GW}$ represents the shared key of the service gateway S-GW and the packet gateway P-GW, and $N_{LD2}$ represents the newly generated random number.

Furthermore, in step S2021, the message authentication code $MAC_{P-GW-A-GW}$ is expressed as:

$$MAC_{P-GW/A-GW} = H(K_{P-GW-A-GW}, N_{A-GW});$$

wherein H represents a hash function, $K_{P-GW-A-GW}$ represents the shared key of the packet gateway P-GW and the gateway A-GW, and $N_{A-GW}$ represents a random number.

Furthermore, in step S2023, the message authentication code $MAC_i$ is expressed as:

$$MAC_i = H(TK_i, N_{AAA} \| LID_{G1} \| LID_i);$$

wherein H represents a hash function, $MAC_i$ represents the message authentication code aggregated by the user equipment $UE_i$, $TK_i$ represents the temporary key, $N_{AAA}$ represents a random number selected by the target access network AAA, $LID_{G1}$ represents the local identity of the G1 group, and $LID_i$ represents the local identity of the user equipment $UE_i$.

The advantages of the present invention are as follows.

The present invention provides a method for batch handover authentication and key agreement oriented to a heterogeneous network. According to the method, users participating in the authentication register on the LTE-A network to obtain their respective identity information. When a large number of users request access to the WLAN, the target network WLAN is discovered by using the ANDSF, and the leader sends a complete group authentication message to the AAA server of the WLAN to request identity authentication. If the authentication succeeds, the AAA server of the WLAN returns an identity authentication response; and if the authentication fails, the continued execution of the protocol is terminated. The method effectively realizes batch authentication of users during handover from the LTE-A network to the WLAN, and thus has high authentication efficiency, small signaling overheads, and high security. In this way, the method is capable of effectively realizing secure and fast handover from the LTE-A network to the WLAN among a large number of users to realize batch handover authentication while greatly reducing the system overhead, thereby providing a strong security guarantee for users under wireless communication.

DETAILED DESCRIPTION OF THE EMBODIMENTS

Figure 1:
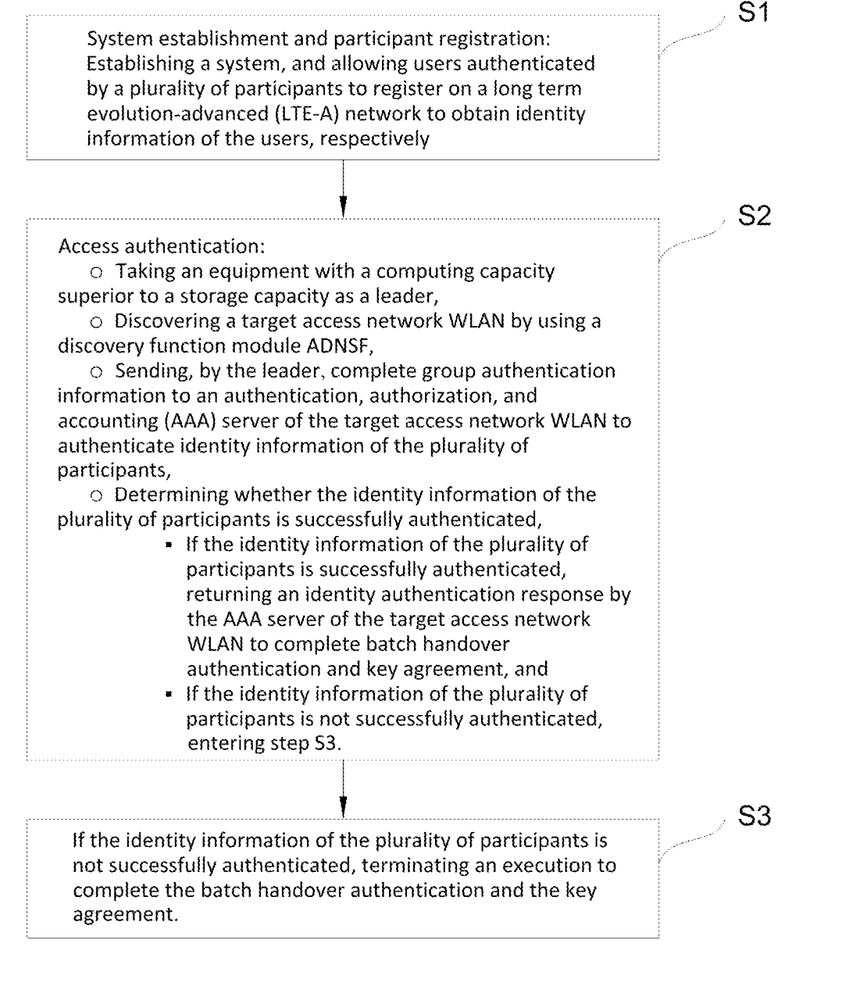
FIGURE is a flowchart of the method of the present invention.

The specific embodiments of the present invention will be described below to help those skilled in the art understand the present invention. It should be clear, however, that the present invention is not limited to the scope of the specific embodiments, for those of ordinary skill in the art, as long as various changes are within the spirit and scope of the present invention defined and determined by the appended claims, these changes are obvious and all inventions and creations that utilize the concept of the present invention shall fall within the scope of the present invention.

Embodiment

As shown in FIGURE, the present invention provides a method for batch handover authentication and key agreement oriented to a heterogeneous network, including:

S1: system establishment and participant registration: a system is established, and users authenticated by a plurality of participants register on an LTE-A network to obtain their respective identity information.

In this embodiment, the user equipment, when roaming from the LTE-A network to the WLAN, firstly needs to register on the LTE-A network. Assuming that all user equipment has completed two-way identity authentication with the LTE-A network, and has obtained relevant parameters for subsequent communication. The relevant parameters include: (1) a temporary identity TID configured to communicate with a discovery function module ANDSF; (2) a group pre-shared group temporary key GTKG1; (3) a pre-shared key (i.e., SKLD-S-GW and SKLD-P-GW) agreed with a service gateway and a packet gateway in an LTE system, respectively; and (4) a session key SKi-BSF agreed by mutually authenticating a bootstrapping server function (BSF) and user equipment ($UE_i$) using a generic bootstrapping architecture (GBA) based on authentication and key agreement (AKA), wherein the discovery function module ANDSF and a pre-shared key SKi-discovery function module ANDSF of the UE are derived from the SKi-BSF key.

S2: access authentication: an equipment with computing capacity superior to storage capacity is taken as the leader, a target access network WLAN is discovered by using the discovery function module ADNSF, the leader sends complete group authentication information to an AAA server of the WLAN to authenticate identity information of each participant, and it is determined whether the identity information is successfully authenticated, if yes, the AAA server of the WLAN returns an identity authentication response to complete the batch handover authentication and the key agreement, otherwise, step S3 is entered.

S3: if the authentication fails, the execution is terminated to complete the batch handover authentication and the key agreement.

In this embodiment, step S2 includes the following steps:

S201: the equipment with computing capacity superior to storage capacity is taken as the leader;

S202: the user equipment $UE_i$ computes a message authentication code $MAC_{i/ANDSF}$ of the user equipment $UE_i$ according to a personal temporary identity $TID_i$ and a group temporary identity $TID_{G1}$, and sends the message authentication code $MAC_{i/ANDSF}$, the personal temporary identity $TID_i$ and the group temporary identity $TID_{G1}$ to the leader;

the message authentication code $MAC_{i/ANDSF}$ is expressed as:

$$MAC_{i/ANDSF}=H(SK_{i\text{-}ANDSF},TID_i\|TID_{G1});$$

wherein H represents a hash function, $SK_{i\text{-}ANDSF}$ represents a shared key of the user equipment $UE_i$ and the discovery function module ANDSF;

S203: the leader aggregates the message authentication code $MAC_i$ of the user equipment $UE_i$, obtains an address of the nearby discovery function module ANDSF by using a domain name server DNS, performs integrity protection by using a random number $N_{LD}$ encrypted and generated by a symmetric key $SK_{LD\text{-}ANDSF}$ and uniquely determined location information $L_{LD}$, route identifier $ID_{route}$ and message authentication code $MAC_{G1/ANDSF}$, and sends the random number $N_{LD}$ and the uniquely determined location information $L_{LD}$, route identifier $ID_{route}$ and message authentication code $MAC_{G1/ANDSF}$ as an information request of the access network to the discovery function module ANDSF;

S204: according to the information request of the access network, the identity information of the user equipment $UE_i$ is verified in batches by using the message authentication code $MAC_{G1/ANDSF}$, and it is determined whether there is an illegitimate user equipment $UE_i$, if yes, step S3 is entered, otherwise, the AAA server of the WLAN returns the identity authentication response, and step S205 is entered;

S205: the discovery function module ANDSF selects a target access network AAA by a preset access network priority strategy, computes parameter information used by a server $AAA_{WLAN}$ of the target access network AAA for authenticating the user equipment $UE_i$, encrypts the random numbers $N_{ANDSF}$ and $N_{LD}$ by using a symmetric key $K_{ANDSF\text{-}AAA}$, computes the local identity, the temporary key and the access node identifier $ID_{NAP}$ of the target access network of the user equipment $UE_i$, respectively, computes a message authentication code $MAC_{ANDSF/AAA}$ in combination with the parameter information of the user equipment $UE_i$, and sends the message authentication code $MAC_{ANDSF/AAA}$ to the server $AAA_{WLAN}$ of the target access network AAA; step S205 specifically includes:

S2051: the discovery function module ANDSF selects the target access network AAA based on the preset access network priority strategy;

S2052: a personal local identity and a group local identity for authenticating the user equipment $UE_i$ are computed for the server $AAA_{WLAN}$ of the target access network AAA, a personal temporary key for generating a session key of the user equipment $UE_i$ and the server $AAA_{WLAN}$ of the target access network AAA is computed according to the personal local identity, and a new temporary key is computed by using a pre-shared key according to the group local identity;

the personal local identity $LID_i$ is expressed as:

$$LID_i=TID_i\oplus H(N_{LD},SK_{i\text{-}ANDSF});$$

wherein $TID_i$ represents the personal temporary identity, $\oplus$ represents an exclusive OR operation, and $SK_{i\text{-}ANDSF}$ represents the shared key of the user equipment $UE_i$ and the discovery function module ANDSF;

the group local identity $LID_{G1}$ is expressed as:

$$LID_{G1}=TID_{G1}\oplus H(N_{LD},GTK_{G1});$$

wherein $TID_{G1}$ represents the group temporary identity, and $GTK_{G1}$ represents the shared key of a G1 group;

the personal temporary key $TK_i$ is expressed as:

$$TK_i=H(SK_{i\text{-}ANDSF}\|N_{LD}\|LID_i)$$

$i=1,2,3,\ldots,n;$ the new temporary key $TK_{G1}$ is expressed as:

$$TK_{G1}=H(GTK_{G1}\|N_{LD}\|LID_{G1});$$

wherein H represents a hash function, $SK_{i\text{-}ANDSF}$ represents the shared key of the user equipment $UE_i$ and the discovery function module ANDSF, $N_{LD}$ represents a random number, $LID_i$ represents the local personal identity, i represents an $n^{th}$ user serial number, and $GTK_{G1}$ represents the shared key of the G1 group;

S2053: the random numbers $N_{ANDSF}$ and $N_{LD}$ are encrypted by using the symmetric key $K_{ANDSF\text{-}AAA}$, and the local identity, the temporary key and the access node identifier $ID_{NAP}$ of the target access network are computed for the user equipment $UE_i$;

S2054: the message authentication code $MAC_{ANDSF/AAA}$ is computed according to the random numbers $N_{ANDSF}$ and $N_{LD}$, the group local identity, the new temporary key, and the access node identifier $ID_{NAP}$ of the target access network and is sent to the server $AAA_{WLAN}$ of the target access network AAA;

the message authentication code $MAC_{ANDSF/AAA}$ is expressed as:

$$MAC_{ANDSF/AAA}=H(K_{ANDSF\text{-}AAA},ID_{ANDSF}\\\|T_{ANDSF}\|N_{ANDSF}\|N_{LD}\|TK_{(1-n)}\|TK_{G1}\|LID_{(1-n)}\\\|LID_{G1}\|ID_{NAP});$$

wherein H represents a hash function, $T_{ANDSF}$ represents a timestamp at which the discovery function module ANDSF sends a message, $TK_{(1-n)}$ represents the personal temporary key, $TK_{G1}$ represents the temporary key shared by the G1 group, $LID_{G1}$ represents the local identity of the G1 group, $ID_{NAP}$ represents an access identifier of the target network, $ID_{ANDSF}$ represents an identity identifier of the ANDSF, and $LID_{(1-n)}$ represents the local personal identity of the $(1-n)^{th}$ user serial number;

S206: the server $AAA_{WLAN}$ of the target access network AAA computes a message authentication code $XMAC_{ANDSF/AAA}$, and determines whether the message authentication code $XMAC_{ANDSF/AAA}$ has passed a verification together with the message authentication code $MAC_{ANDSF/AAA}$ from the ANDSF, if yes, step S207 is entered, otherwise, the protocol is terminated and step S3 is entered;

S207: the server $AAA_{WLAN}$ of the target access network AAA selects a random number $N_{AAA}$, computes a session key corresponding to the user equipment $UE_i$ one-to-one, obtains a message authentication code $MAC_{AAA/ANDSF}$ by performing encryption protection on the random number $N_{AAA}$ using the symmetric key $K_{ANDSF\text{-}AAA}$ according to the corresponding session key, and sends the message authentication code $MAC_{AAA/ANDSF}$ to the discovery function module ANDSF;

S208: a message authentication code $XMAC_{AAA/ANDSF}$ is computed according the random number $N_{AAA}$ and the symmetric key $K_{ANDSF\text{-}AAA}$, the message authentication code $MAC_{AAA/ANDSF}$ is compared with the message authentication code $XMAC_{AAA/ANDSF}$, message integrity and identity information of the server $AAA_{WLAN}$ of the target access network AAA are verified according to the comparison result, the random numbers $N_{AAA}$ and $N_{LD}$, the access node identifier $ID_{NAP}$ of the target access network and the timestamp $T_{ANDSF}$ are encrypted by using the group temporary key $GTK_{G1}$, a message authentication code $MAC_{ANDSF/G1}$ is computed according to the group temporary key $GTK_{G1}$, the random numbers $N_{AAA}$ and $N_{LD}$ and the timestamp $T_{ANDSF}$, and an access network selection decision is sent to the leader;

the message authentication code $XMAC_{AAA/ANDSF}$ is expressed as:

$$XMAC_{AAA/ANDSF}=H(K_{ANDSF\text{-}AAA},ID_{AAA}\|T_{AAA\text{-}1}\|\|N_{AAA}\|N_{ANDSF});$$

wherein $XMAC_{AAA/ANDSF}$ represents a message authentication code sent by the target access network AAA to the ANDSF, $ID_{AAA}$ represents an identity identifier of the target access network AAA, $T_{AAA}$ represents the timestamp at which the target access network AAA sends the message, and $N_{ANDSF}$ represents a random number of the discovery function module ANDSF;

the message authentication code $MAC_{ANDSF/G1}$ is expressed as:

$$MAC_{ANDSF/G1}=H(GTK_{G1}, LID_{G1}\|N_{AAA}\|N_{LD}\|ID_{NAP}\|T_{ANDSF});$$

wherein $MAC_{ANDSF/G1}$ represents a message authentication code sent by the discovery function module ANDSF to the G1 group, $GTK_{G1}$ represents the group temporary key, $ID_{NAP}$ represents an access node identifier of the target access network, $LID_{G1}$ represents the local identity of the G1 group, and $T_{ANDSF}$ represents the timestamp;

S209: the message is decrypted and the random number $N_{LD}$ is checked by using the group temporary key $GTK_{G1}$, according to the message authentication code $MAC_{ANDSF/G1}$, the integrity of the message received in S208 is verified and the message source is authenticated, and it is determined whether the message source is successfully authenticated, if yes, the leader broadcasts a message of the access network selection decision to other user equipment $UE_i$, and step S2010 is entered, otherwise, the protocol is terminated and step S3 is entered;

the message authentication code $MAC_{ANDSF/G1}$ is expressed as:

$$MAC_{ANDSF/G1}=H(GTK_{G1}, LID_{G1}\|N_{AAA}\|N_{LD}\|ID_{NAP}\|T_{ANDSF});$$

wherein $GTK_{G1}$ represents the group temporary key, $ID_{NAP}$ represents the access node identifier of the target access network, $N_{LD}$ represents a random number of the leader, $N_{AAA}$ represents a random number selected by the server of the target access network AAA, $LID_{G1}$ represents a local identity identifier of a user group/equipment UE, $T_{ANDSF}$ represents the timestamp at which the discovery function module ANDSF sends the message;

S2010: the user equipment UE verifies the decrypted message, computes a session key $SK_{iAAA}$ shared with the server $AAA_{WLAN}$ of the target access network AAA according to the verification result, computes the local personal identity $LID_i$ and the local group identity $LID_{G1}$ for the users to access the target access network, and a personal temporary key $TK_i$ for generating a session between the user equipment $UE_i$ and the server $AAA_{WLAN}$ of the target access network AAA, computes a new temporary key $TK_{G1}$ and a message authentication code $MAC_{i/LD}$ according to a preset shared key, and sends a handover request message to the leader by using the new temporary key $TK_{G1}$ and the message authentication code $MAC_{i/LD}$;

the message authentication code $MAC_{i/D}$ is expressed as:

$$MAC_{i/LD}=H(TK_{G1},LID_i\|LID_{G1}\|T_i);$$

wherein $TK_{G1}$ represents the new temporary key, and $T_i$ represents the timestamp at which each UE sends the message;

the session key $SK_{iAAA}$ is expressed as:

$$SK_{iAAA}=H(TK_i\|N_{AAA}\|N_{LD});$$

wherein $TK_i$ represents the personal temporary key, and both $N_{LD}$ and $N_{AAA}$ represent random numbers;

the local personal identity $LID_i$ is expressed as:

$$LID_i=TID_i\oplus(N_{LD},SK_{i\text{-}ANDSF});$$

wherein $SK_{i\text{-}ANDSF}$ represents the shared key of the user equipment $UE_i$ and the discovery function module ANDSF, $TID_i$ represents the personal temporary identity, $N_{LD}$ represents a random number, and $SK_{i\text{-}ANDSF}$ represents the pre-shared key of the user equipment $UE_i$ and the discovery function module ANDSF;

the local group identity $LID_{G1}$ is expressed as:

$$LID_{G1}=TID_{G1}\oplus H(N_{LD},GTK_{G1});$$

wherein $GTK_{G1}$ represents the shared key of the G1 group, $N_{LD}$ represents a random number, and H represents a hash function;

the personal temporary key $TK_i$ is expressed as:

$$TK_i=H(SK_{i\text{-}ANDSF}\|N_{LD}\|LID_i);$$

wherein H represents a hash function, $SK_{i\text{-}ANDSF}$ represents the shared key of the user equipment $UE_i$ and the discovery function module ANDSF, $N_{LD}$ represents a random number, and $LID_i$ represents the local personal identity;

the new temporary key $TK_{G1}$ is expressed as:

$$TK_{G1}=H(GTK_{G1}\|N_{LD}\|LID_{G1});$$

wherein $GTK_{G1}$ represents the shared key of the G1 group, $N_{LD}$ represents a random number, and $LID_{G1}$ represents the local identity of the G1 group;

the message authentication code $MAC_{i/LD}$ is expressed as:

$$MAC_{i/LD}=H(TK_{G1},LIG_i\|LID_{G1}\|T_i);$$

wherein $TK_{G1}$ represents the temporary key for users in the whole G1 group to access the WLAN, $LID_i$ represents the local identity of the user equipment $UE_i$, $LID_{G1}$ represents the local identity of the G1 group, and $T_i$ represents the timestamp at which each UE sends the message;

S2011: the leader collects and verifies the handover request information of the user equipment $UE_i$, performs encryption protection on the newly generated random number $N_{LD2}$ by using the symmetric key $SK_{LD\text{-}S\text{-}GW}$, computes a corresponding message authentication code $MAC_{LD/S\text{-}GW}$ in combination with the timestamp $T_{LD}$, and generates an identity authentication ticket TicP-GW for a service gateway S-GW by using the message authentication code $MAC_{LD/S\text{-}GW}$, wherein the handover information is sent to the service gateway S-GW via a base station eNodeB;

the message authentication code $MAC_{LD/S\text{-}GW}$ is expressed as:

$$MAC_{LD/S\text{-}GW}=H(SK_{LD\text{-}S\text{-}GW},T_{LD}\|N_{LD2});$$

the identity authentication ticket TicP-GW is expressed as:

$$Tic\ P\text{-}GW=\{LID_{1-n}\|LID_{G1}\|T_{LD}\|N_{LD2}\|ID_{NAP}\|H(LID_{(1-n)}\|T_{LD}\|N_{LD2}\|ID_{NAP})\}SK_{LD\text{-}P\text{-}GW};$$

wherein $ID_{NAP}$ represents the access node identifier of the target access network, $SK_{LD\text{-}P\text{-}GW}$ represents a pre-shared key of the leader and the packet gateway P-GW, $T_{LD}$ represents the timestamp, $N_{LD2}$ represents the newly generated random number, $LID_{(1-n)}$ represents the local personal identity of the $(1-n)^{th}$ user serial number, $LID_{G1}$ represents the local identity of the G1 group, and $T_{LD}$ represents the timestamp;

S2012: the service gateway S-GW decrypts the information to obtain the random number $N_{LD2}$, computes a message authentication code $XMAC_{LD/S-GW}$ according to the random number $N_{LD2}$, compares the message authentication code $XMAC_{LD/S-GW}$ with the received message authentication code $MAC_{LD/S-GW}$, and determines whether the two values are equal, if yes, the authentication is successful, and step S2013 is entered, otherwise, step S2012 is repeated;

S2013: a message authentication code $MAC_{S-GW/P-GW}$ is computed according to the random number $N_{LD2}$, and is forwarded to the packet gateway P-GW together with the identity authentication ticket Tic P-GW as a fast proxy binding update request;

the message authentication code $MAC_{S-GW/P-GW}$ is expressed as:

$$MAC_{S-GW/P-GW}=H(K_{S-GW-P-GW},N_{LD2});$$

wherein $K_{S-GW-P-GW}$ represents the shared key of the service gateway S-GW and the packet gateway P-GW;

S2014: the packet gateway P-GW decrypts the identity authentication ticket Tic P-GW, generates a message authentication code $XMAC_{S-GW/P-GW}$ according to the random number $N_{LD2}$, compares the message authentication code $XMAC_{S-GW/P-GW}$ with the message authentication code $MAC_{S-GW/P-GW}$ from the service gateway S-GW, and determines whether the two values are equal, if yes, it is determined that the service gateway S-GW is a legitimate node authorized by the user equipment $UE_i$, the packet gateway P-GW computes the message authentication code $MAC_{P-GW/S-GW}$ according to the random number $N_{LD2}$, and sends the message authentication code $MAC_{P-GW/S-GW}$ as a fast proxy binding acknowledgment message to the service gateway S-GW, and step S2015 is entered, otherwise, the protocol is terminated and step S3 is entered;

the message authentication code $MAC_{P-GW/S-GW}$ is expressed as:

$$MAC_{P-GW/S-GW}=H(K_{S-GW-P-GW},N_{LD2}+1)$$

the message authentication code $XMAC_{S-GW/P-GW}$ is expressed as:

$$XMAC_{S-GW/P-GW}=H(K_{S-GW-P-GW},N_{LD2});$$

Wherein H represents a hash function, $K_{S-GW-P-GW}$ represents the shared key of the service gateway S-GW and the packet gateway P-GW, and $N_{LD2}$ represents the newly generated random number;

S2015: the packet gateway P-GW buffers data packets of the user equipment $UE_i$ into a database of the packet gateway P-GW, and receives returned data packets;

S2016: the packet gateway P-GW uses the symmetric key $K_{P-GW-A-GW}$ to encrypt the generated random number $N_{P-GW}$ and the local identity $LID_i$ of all user equipment $UE_i$, and computes a corresponding message authentication code $MAC_{P-GW/A-GW}$;

the message authentication code $MAC_{P-GW/A-GW}$ is expressed as:

$$MRC_{P-GW/A-GW}=H(K_{P-GW-A-GW},LID_{(1-n)}\|LID_{G1}\|N_{P-GW});$$

wherein H represents a hash function, $K_{P-GW-A-GW}$ represents the shared key of the packet gateway P-GW and a gateway A-GW, $LID_{(1-n)}$ represents local identities of n users contained in the G1 group for identity authentication when accessing the WLAN, $LID_{G1}$ represents the group local identity, and $N_{P-GW}$ represents a random number;

S2017: the cipher text and the message authentication code $MAC_{P-GW/A-GW}$ obtained in step S2016 are sent as a handover packet forwarding address request message to the gateway A-GW, a proxy care-of address CoA of the gateway A-GW is obtained, and a temporary IP address is allocated to the user equipment $UE_i$ by using the proxy care-of address CoA;

S2018: the forwarding address request message is decrypted by using the gateway A-GW to generate a message authentication code $XMAC_{P-GW/A-GW}$, and the packet gateway P-GW is authenticated and message integrity is checked by using the message authentication code $XMAC_{P-GW/A-GW}$;

S2019: it is determined whether the authentication is successful, if yes, the gateway A-GW selects a random number $N_{A-GW}$, uses the shared key $K_{P-GW-A-GW}$ of the packet gateway P-GW and the gateway A-GW to encrypt the random number $N_{A-GW}$ and the proxy care-of the address CoA, computes a message authentication code $MAC_{A-GW/P-GW}$, and sends the encrypted cipher text and the corresponding message authentication code $MAC_{A-GW/P-GW}$ as a response to a handover packet forwarding address request HPAR message to the packet gateway P-GW, and step S2020 is entered, otherwise, the protocol is terminated and step S3 is entered;

the message authentication code $MAC_{A-GW/P-GW}$ is expressed as:

$$MAC_{A-GW/P-GW}=H(K_{P-GW-A-GW},\text{Proxy-CoAA-GW}\|N_{A-GW});$$

wherein Proxy-CoAA-GW represents the proxy care-of address of the gateway A-GW, H represents a hash function, $K_{P-GW-A-GW}$ represents the shared key of the packet gateway P-GW and the gateway A-GW, and $N_{A-GW}$ represents a random number;

S2020: the packet gateway P-GW decrypts the handover packet forwarding address request HPAR message to obtain the proxy care-of address CoA and the random number $N_{A-GW}$ of the gateway A-GW, computes the message authentication code $XMAC_{A-GW/P-GW}$ by obtaining the proxy care-of address CoA, compares the message authentication code $XMAC_{A-GW/P-GW}$ with the $MAC_{A-GW/P-GW}$, and determines whether the authenticated identity of the gateway A-GW is legitimate according to the comparison result, if yes, the message authentication code $MAC_{P-GW/A-GW}$ is computed according to the random number $N_{A-GW}$, and is sent as a fast proxy binding update FPBU message to the gateway A-GW to establish a connection, and step S2021 is entered, otherwise, the protocol is terminated and step S3 is entered;

S2021: a message authentication code $XMAC_{P-GW-A-GW}$ is computed by using the random number $N_{A-GW}$ to authenticate the packet gateway P-GW, and the message authentication code $MAC_{A-GW/P-GW}$ is computed by using the random numbers $N_{A-GW}$ and $N_{P-GW}$ and is sent as a fast proxy binding acknowledgment message to the packet gateway P-GW to indicate that the connection is established successfully;

the message authentication code $MAC_{P-GW-A-GW}$ is expressed as:

$$MAC_{P-GW/A-GW}=H(K_{P-GW-A-GW},N_{A-GW});$$

wherein H represents a hash function, $K_{P-GW-A-GW}$ represents the shared key of the packet gateway P-GW and the gateway A-GW, and $N_{A-GW}$ represents a random number;

S2022: the user equipment $UE_i$ is disconnected from a current base station, and is connected to a WLAN access node IDNAP;

S2023: the leader collects and aggregates the message authentication code $MAC_i$ into $MAC_{G1}$, and sends the $MAC_{G1}$ to the server $AAA_{WLAN}$ of the target access network AAA via the WLAN access gateway A-GW;

the message authentication code $MAC_i$ is expressed as:

$$MAC_i = H(TK_i, N_{AAA} \| LID_{G1} \| LID_i);$$

wherein H represents a hash function, $MAC_i$ represents the message authentication code aggregated by the user equipment $UE_i$, $TK_i$ represents the temporary key, $N_{AAA}$ represents a random number selected by the target access network AAA, $LID_{G1}$ represents the local identity of the G1 group, $LID_i$ represents the local identity of the user equipment $UE_i$;

S2024: it is determined whether the server $AAA_{WLAN}$ of the target access network AAA has successfully verified the received message, if yes, a response message $MAC_2$ is returned and step S2025 is entered; otherwise, this message is ignored and step 2025 is entered;

S2025: the buffered data packets are forwarded by the service gateway P-GW during the handover process of the user equipment $UE_i$; and S2026: when all the buffered data packets are forwarded to the user equipment $UE_i$, a PMIPv6 tunnel is created between the packet gateway P-GW and the access gateway A-GW to complete access to authentication.

By means of the above design, the present invention can effectively realize batch authentication of users during handover from the LTE-A network to the WLAN, and thus has high authentication efficiency, small signaling overheads, and high security.

What is claimed is:

1. A method for a batch handover authentication and a key agreement oriented to a heterogeneous network, comprising the following steps:

S1, system establishment and participant registration: establishing a system, and allowing users authenticated by a plurality of participants to register on a long term evolution-advanced (LTE-A) network to obtain identity information of the users, respectively;

S2, access authentication: taking an equipment with a computing capacity superior to a storage capacity as a leader, discovering a target access network WLAN by using a discovery function module ADNSF, sending, by the leader, complete group authentication information to an authentication, authorization, and accounting (AAA) server of the target access network WLAN to authenticate identity information of the plurality of participants, determining whether the identity information of the plurality of participants is successfully authenticated, if the identity information of the plurality of participants is successfully authenticated, returning an identity authentication response by the AAA server of the target access network WLAN to complete the batch handover authentication and the key agreement, and if the identity information of the plurality of participants is not successfully authenticated, entering step S3; and S3, if the identity information of the plurality of participants is not successfully authenticated, terminating an execution to complete the batch handover authentication and the key agreement, wherein step S2 comprises the following steps:

S201, taking the equipment with the computing capacity superior to the storage capacity as the leader;

S202, computing, by a user equipment $UE_i$, a message authentication code $MAC_{i/ANDSF}$ of the user equipment $UE_i$ according to a personal temporary identity $TID_i$ and a group temporary identity $TID_{G1}$, and sending the message authentication code $MAC_{i/ANDSF}$, the personal temporary identity $TID_i$ and the group temporary identity $TID_{G1}$ to the leader; wherein the message authentication code $MAC_{i/ANDSF}$ is expressed as:

$$MAC_{i/ANDSF} = H(SK_{i/ANDSF}, TID_i \| TID_{G1});$$

wherein H represents a first hash function, $SK_{i-ANDSF}$ represents a shared key of the user equipment $UE_i$ and the discovery function module ANDSF;

S203, aggregating a message authentication code $MAC_i$ of the user equipment $UE_i$ by the leader, obtaining an address of a nearby discovery function module ANDSF by using a domain name server DNS, and performing an integrity protection by using a random number $N_{LD}$, location information $L_{LD}$, a route identifier $ID_{route}$ and a message authentication code $MAC_{G1/ANDSF}$, and sending the random number $N_{LD}$, the location information $L_{LD}$, the route identifier $ID_{route}$ and the message authentication code $MAC_{G1/ANDSF}$ as an information request of the target access network WLAN to the discovery function module ANDSF, wherein the random number $N_{LD}$ is encrypted and generated by a symmetric key $SK_{LD-ANDSF}$, and the location information $L_{LD}$, the route identifier $ID_{route}$ and the message authentication code $MAC_{G1/ANDSF}$ are uniquely determined;

S204, according to the information request of the target access network WLAN, verifying identity information of the user equipment $UE_i$ in batches by using the message authentication code $MAC_{G1/ANDSF}$, determining whether there is an illegitimate user equipment $UE_i$, if there is the illegitimate user equipment $UE_i$, entering step S3, and if there is no illegitimate user equipment $UE_i$, returning the identity authentication response by the AAA server of the target access network WLAN, and entering step S205;

S205, selecting a target access network AAA by using the discovery function module ANDSF based on a preset access network priority strategy, computing parameter information used by a server $AAA_{WLAN}$ of the target access network AAA for authenticating the user equipment $UE_i$, encrypting a random number $N_{ANDSF}$ and the random number $N_{LD}$ by using a symmetric key $K_{ANDSF-AAA}$, computing a local identity, a temporary key and an access node identifier $ID_{NAP}$ of the target access network AAA of the user equipment $UE_i$, respectively, computing a message authentication code $MAC_{ANDSF/AAA}$ in combination with the parameter information of the user equipment $UE_i$, and sending the message authentication code $MAC_{ANDSF/AAA}$ to the server $AAA_{WLAN}$ of the target access network AAA;

S206, computing a message authentication code $XMAC_{ANDSF/AAA}$ by the server $AAA_{WLAN}$ of the target access network AAA, determining whether the message authentication code $XMAC_{ANDSF/AAA}$ has passed a verification by the server $AAA_{WLAN}$ of the target access network AAA together with the message authentication code $MAC_{ANDSF/AAA}$ from the discovery function module ANDSF, if the message authentication code $XMAC_{ANDSF/AAA}$ has passed the verification, entering step S207, and if the message authentication code $XMAC_{ANDSF/AAA}$ fails to pass the verification, terminating a protocol and entering step S3;

S207, selecting a random number $N_{AAA}$ by the server $AAA_{WLAN}$ of the target access network AAA, computing a session key corresponding to the user equipment $UE_i$ one-to-one, obtaining a message authentication code $MAC_{AAA/ANDSF}$ by performing an encryption protection on the random number $N_{AAA}$ using the symmetric key $K_{ANDSF-AAA}$ according to the session key, and sending the message authentication code $MAC_{AAA/ANDSF}$ to the discovery function module ANDSF;

S208, computing a message authentication code $XMAC_{AAA/ANDSF}$ according the random number $N_{AAA}$ and the symmetric key $K_{ANDSF-AAA}$, comparing the message authentication code $MAC_{AAA/ANDSF}$ with the message authentication code $XMAC_{AAA/ANDSF}$ to obtain a first comparison result, verifying message integrity and identity information of the server $AAA_{WLAN}$ of the target access network AAA according to the first comparison result, encrypting the random number $N_{AAA}$, the random number $N_{LD}$, the access node identifier $ID_{NAP}$ of the target access network AAA and a timestamp $T_{ANDSF}$ by using a group temporary key $GTK_{G1}$, computing a message authentication code $MAC_{ANDSF/G1}$ according to the group temporary key $GTK_{G1}$, the random number $N_{AAA}$, the random number $N_{LD}$ and the timestamp $T_{ANDSF}$, and sending an access network selection decision to the leader;

S209, decrypting the random number $N_{AAA}$, the random number $N_{LD}$, the access node identifier $ID_{NAP}$ of the target access network AAA and the timestamp $T_{ANDSF}$ and checking the random number $N_{LD}$ by using the group temporary key $GTK_{G1}$, verifying an integrity of the random number $N_{AAA}$, the random number $N_{LD}$, the access node identifier $ID_{NAP}$ of the target access network AAA and the timestamp $T_{ANDSF}$ received in S208 and authenticating a message source according to the message authentication code $MAC_{ANDSF/G1}$, determining whether the message source is successfully authenticated, if the message source is successfully authenticated, broadcasting, by the leader, a message of the access network selection decision to other user equipment $UE_i$, and entering step S2010, and if the message source is not successfully authenticated, terminating the protocol and entering step S3; wherein the message authentication code $MAC_{ANDSF/G1}$ is expressed as:

$MAC_{ANDSF/G1}=H(GTK_{G1}, LID_{G1}||N_{AAA}||N_{LD}||ID_{NAP}||T_{ANDSF})$;

wherein $GTK_{G1}$ represents the group temporary key, $ID_{NAP}$ represents the access node identifier of the target access network AAA, $N_{LD}$ represents a random number of the leader, $N_{AAA}$ represents a random number selected by the server $AAA_{WLAN}$ of the target access network AAA, $LID_{G1}$ represents a local identity identifier of a user group/equipment UE, and $T_{ANDSF}$ represents a first timestamp, wherein the discovery function module ANDSF sends the message authentication code $MAC_{ANDSF/G1}$ at the first timestamp;

S2010, verifying the random number $N_{AAA}$, the random number $N_{LD}$, the access node identifier $ID_{NAP}$ of the target access network AAA and the timestamp $T_{ANDSF}$ by the user equipment $UE_i$ to obtain a verification result, computing a session key $SK_{iAAA}$ shared with the server $AAA_{WLAN}$ of the target access network AAA according to the verification result, computing a personal local identity $LID_i$ and a group local identity $LID_{G1}$ for the users to access the target access network AAA, and a personal temporary key $TK_i$ for generating a session between the user equipment $UE_i$ and the server $AAA_{WLAN}$ of the target access network AAA, computing a temporary key $TK_{G1}$ and a message authentication code $MAC_{i/LD}$ according to a preset shared key, and sending a handover request message to the leader by using the temporary key $TK_{G1}$ and the message authentication code $MAC_{i/LD}$;

S2011, collecting and verifying, by the leader, the handover request information of the user equipment $UE_i$, performing an encryption protection on a random number $N_{LD2}$ by using a symmetric key $SK_{LD-S-GW}$, wherein the random number $N_{LD2}$ is newly generated, computing a message authentication code $MAC_{LD/S-GW}$ corresponding a timestamp $T_{LD}$ in combination with the timestamp $T_{LD}$, generating an identity authentication ticket Tic P-GW for a service gateway S-GW by using the message authentication code $MAC_{LD/S-GW}$, and sending the handover request information to the service gateway S-GW via a base station eNodeB;

S2012, decrypting the handover request information by the service gateway S-GW to obtain the random number $N_{LD2}$, computing a message authentication code $XMAC_{LD/S-GW}$ according to the random number $N_{LD2}$, comparing the message authentication code $XMAC_{LD/S-GW}$ with the message authentication code $MAC_{LD/S-GW}$, determining whether the message authentication code $XMAC_{LD/S-GW}$ and the message authentication code $MAC_{LD/S-GW}$ are equal, if the message authentication code $XMAC_{LD/S-GW}$ and the message authentication code $MAC_{LD/S-GW}$ are equal, the authentication is successful, and entering step S2013, and if the message authentication code $XMAC_{LD/S-GW}$ and the message authentication code $MAC_{LD/S-GW}$ are not equal, repeating step S2012;

S2013, computing a message authentication code $MAC_{S-GW/P-GW}$ according to the random number $N_{LD2}$, and forwarding the message authentication code $MAC_{S-GW/P-GW}$ together with the identity authentication ticket Tic P-GW as a fast proxy binding update request to a packet gateway P-GW; wherein the message authentication code $MAC_{S-GW/P-GW}$ is expressed as:

$MAC_{S-GW/P-GW}=H(K_{S-GW-P-GW},N_{LD2})$;

wherein $K_{S-GW/P-GW}$ represents a shared key of the service gateway S-GW and the packet gateway P-GW;

S2014, decrypting the identity authentication ticket Tic P-GW by the packet gateway P-GW, generating a message authentication code $XMAC_{S-GW/P-GW}$ according to the random number $N_{LD2}$, comparing the message authentication code $XMAC_{S-GW/P-GW}$ with the message authentication code $MAC_{S-GW/P-GW}$ from the service gateway S-GW, and determining whether the message authentication code $XMAC_{S-GW/P-GW}$ and the message authentication code $MAC_{S-GW/P-GW}$ are equal, if the message authentication code $XMAC_{S-GW/P-GW}$ and the message authentication code $MAC_{S-GW/P-GW}$ are equal, determining that the service gateway S-GW is a legitimate node authorized by the user equipment $UE_i$, computing a message authentication code $MAC_{S-GW/P-GW}$ by the packet gateway P-GW according to the random number $N_{LD2}$, sending the message authentication code $MAC_{P-GW/S-GW}$ as a first fast proxy binding acknowledgment message to the service gateway S-GW, and entering step S2015, and if the message authentication code $XMAC_{S-GW/P-GW}$ and the message authentication code $MAC_{S\text{-}GW/P\text{-}GW}$ are not equal, terminating the protocol and entering step S3;

S2015, buffering, by the packet gateway P-GW, data packets of the user equipment $UE_i$ into a database of the packet gateway P-GW, and receiving returned data packets;

S2016, encrypting, by the packet gateway P-GW using a symmetric key $K_{P\text{-}GW\text{-}A\text{-}GW}$, a generated random number $N_{P\text{-}GW}$ and the personal local identity $LID_i$ of the user equipment $UE_i$, and computing a message authentication code $MAC_{P\text{-}GW/A\text{-}GW}$ corresponding to the generated random number $N_{P\text{-}GW}$; wherein the message authentication code $MAC_{P\text{-}GW/A\text{-}GW}$ is expressed as:

$$MAC_{P\text{-}GW/A\text{-}GW} = H(K_{P\text{-}GW\text{-}A\text{-}GW}, LID_{(1-n)} \| LID_{G1} \| N_{P\text{-}GW});$$

wherein H represents a second hash function, $K_{P\text{-}GW\text{-}A\text{-}GW}$ represents a shared key of the packet gateway P-GW and a WLAN access gateway A-GW, $LID_{(1-n)}$ represents local identities of n users contained in a G1 group for identity authentication when accessing the target access network WLAN, $LID_{G1}$ represents the group local identity, and $N_{P\text{-}GW}$ represents the generated random number;

S2017, sending the generated random number $N_{P\text{-}GW}$, the personal local identity $LID_i$ and the message authentication code $MAC_{P\text{-}GW/A\text{-}GW}$ obtained in step S2016 as a handover packet forwarding address request message to the WLAN access gateway A-GW, obtaining a proxy care-of address CoA of the WLAN access gateway A-GW, and allocating a temporary IP address to the user equipment UE by using the proxy care-of address CoA;

S2018, decrypting the handover packet forwarding address request message by using the WLAN access gateway A-GW to generate a message authentication code $XMAC_{P\text{-}GW/A\text{-}GW}$, and authenticating the packet gateway P-GW and checking message integrity by using the message authentication code $XMAC_{P\text{-}GW/A\text{-}GW}$;

S2019, determining whether the packet gateway P-GW is successfully authenticated, wherein if the packet gateway P-GW is successfully authenticated, the WLAN access gateway A-GW selects a random number $N_{A\text{-}GW}$, the WLAN access gateway A-GW uses the shared key $K_{P\text{-}GW/A\text{-}GW}$ of the packet gateway P-GW and the WLAN access gateway A-GW to encrypt the random number $N_{A\text{-}GW}$ and the proxy care-of address CoA, the WLAN access gateway A-GW computes a message authentication code $MAC_{A\text{-}GW/P\text{-}GW}$, and the WLAN access gateway A-GW sends the generated random number $N_{P\text{-}GW}$, the personal local identity $LID_i$ and the message authentication code $MAC_{A\text{-}GW/P\text{-}GW}$ as a response to a handover packet forwarding address request HPAR message to the packet gateway P-GW, and entering step S2020, and if the packet gateway P-GW is not successfully authenticated, terminating the protocol and entering step S3;

the message authentication code $MAC_{A\text{-}GW/P\text{-}GW}$ is expressed as:

$$MAC_{A\text{-}GW/P\text{-}GW} = H(K_{P\text{-}GW\text{-}A\text{-}GW}, \text{Proxy-}CoAA\text{-}GW \| N_{A\text{-}GW});$$

wherein Proxy-CoAA-GW represents the proxy care-of address of the WLAN access gateway A-GW, H represents a third hash function, $K_{P\text{-}GW\text{-}A\text{-}GW}$ represents the shared key of the packet gateway P-GW and the WLAN access gateway A-GW, and $N_{A\text{-}GW}$ represents the random number $N_{A\text{-}GW}$;

S2020, decrypting the handover packet forwarding address request HPAR message by the packet gateway P-GW to obtain the proxy care-of address CoA and the random number $N_{A\text{-}GW}$ of the WLAN access gateway A-GW, computing a message authentication code $XMAC_{A\text{-}GW/P\text{-}GW}$ by obtaining the proxy care-of address CoA, comparing the message authentication code $XMAC_{A\text{-}GW/P\text{-}GW}$ with the message authentication code $MAC_{A\text{-}GW/P\text{-}GW}$ to obtain a second comparison result, determining whether an authenticated identity of the WLAN access gateway A-GW is legitimate according to the second comparison result, if the authenticated identity of the WLAN access gateway A-GW is legitimate, computing the message authentication code $MAC_{P\text{-}GW/A\text{-}GW}$ according to the random number $N_{A\text{-}GW}$, and sending the message authentication code $MAC_{P\text{-}GW/A\text{-}GW}$ as a fast proxy binding update (FPBU) message to the WLAN access gateway A-GW to establish a connection, and entering step S2021, if the authenticated identity of the WLAN access gateway A-GW is illegitimate, terminating the protocol and entering step S3;

S2021, computing a message authentication code $XMAC_{P\text{-}GW/A\text{-}GW}$ by using the random number $N_{A\text{-}GW}$ to authenticate the packet gateway P-GW, computing the message authentication code $MAC_{A\text{-}GW/P\text{-}GW}$ by using the random number $N_{A\text{-}GW}$ and the generated random number $N_{P\text{-}GW}$, and sending the message authentication code $MAC_{A\text{-}GW/P\text{-}GW}$ as a second fast proxy binding acknowledgment message to the packet gateway P-GW to indicate that the connection is established successfully;

S2022, disconnecting the user equipment $UE_i$ from a current base station, and connecting the user equipment $UE_i$ to a WLAN access node IDNAP;

S2023, collecting and aggregating, by the leader, the message authentication code $MAC_i$;

into $MAC_{G1}$, and sending the $MAC_{G1}$ to the server $AAA_{WLAN}$ of the target access network AAA via the WLAN access gateway A-GW;

S2024, determining whether the server $AAA_{WLAN}$ of the target access network AAA has successfully verified the $MAC_{G1}$, if the server $AAA_{WLAN}$ of the target access network AAA has successfully verified the $MAC_{G1}$, returning a response message $MAC_2$ and entering step S2025;

if the server $AAA_{WLAN}$ of the target access network AAA fails to verify the $MAC_{G1}$, ignoring the $MAC_{G1}$ and entering step 2025;

S2025, forwarding the data packets by the service gateway P-GW during a handover process of the user equipment $UE_i$; and S2026, when the data packets are forwarded to the user equipment $UE_i$, creating a proxy mobile IPv6 (PMIPv6) tunnel between the packet gateway P-GW and the WLAN access gateway A-GW to complete access to the batch handover authentication.

2. The method according to claim 1, wherein step S205 comprises the following steps:

S2051, selecting the target access network AAA by the discovery function module ANDSF based on the preset access network priority strategy;

S2052, computing the personal local identity and the group local identity for authenticating the user equipment $UE_i$ for the server $AAA_{WLAN}$ of the target access network AAA, computing the personal temporary key for generating the session key of the user equipment $UE_i$ and the server $AAA_{WLAN}$ of the target access network AAA according to the personal local identity, and computing the temporary key $TK_{G1}$ by using a pre-shared key according to the group local identity; wherein the personal local identity $LID_i$ is expressed as:

$$LID_i = TID_i \oplus H(N_{LD}, SK_{i\text{-}ANDSF});$$

wherein $TID_i$ represents the personal temporary identity, $\oplus$ represents an exclusive OR operation, and $SK_{i\text{-}ANDSF}$ represents the shared key of the user equipment $UE_i$ and the discovery function module ANDSF; the group local identity $LID_{G1}$ is expressed as:

$$LID_{G1} = TID_{G1} \oplus H(N_{LD}, GTK_{G1});$$

wherein $TID_{G1}$ represents the group temporary identity, and $GTK_{G1}$ represents a shared key of the G1 group; the personal temporary key $TK_i$ is expressed as:

$$TK_i = H(SK_{i\text{-}ANDSF} \| N_{LD} \| LID_i)$$

$i = 1, 2, 3, \ldots, n;$ the new temporary key $TK_{G1}$ is expressed as:

$$TK_{G1} = H(GTK_{G1} \| N_{LD} \| LID_{G1});$$

wherein H represents a fourth hash function, $SK_{i\text{-}ANDSF}$ represents the shared key of the user equipment $UE_i$ and the discovery function module ANDSF, $N_{LD}$ represents the random number $N_{LD}$, $LID_i$ represents the personal local identity, i represents an $n^{th}$ user serial number, and $GTK_{G1}$ represents the shared key of the G1 group;

S2053, encrypting the random number $N_{ANDSF}$ and the random number $N_{LD}$ by using the symmetric key $K_{ANDSF\text{-}AAA}$, and computing the local identity, the temporary key and the access node identifier $ID_{NAP}$ of the target access network for the user equipment $UE_i$;

S2054, computing the message authentication code $MAC_{ANDSF/AAA}$ according to the random number $N_{ANDSF}$, the random number $N_{LD}$, the group local identity, the temporary key $TK_{G1}$, and the access node identifier $ID_{NAP}$ of the target access network, and sending the message authentication code $MAC_{ANDSF/AAA}$ to the server $AAA_{WLAN}$ of the target access network AAA;

the message authentication code $MAC_{ANDSF/AAA}$ is expressed as:

$$MAC_{ANDSF/AAA} = H(K_{ANDSF\text{-}AAA}, ID_{ANDSF}, \\ \| T_{ANDSF} \| N_{ANDSF} \| N_{LD} \| TK_{(1-n)} \| TK_{G1} \| LID_{(1-n)} \\ \| LID_{G1} \| ID_{NAP});$$

wherein H represents a fifth hash function, $T_{ANDSF}$ represents a second timestamp, wherein the discovery function module ANDSF sends the message authentication code $MAC_{ANDSF/AAA}$ at the second timestamp, $TK_{(1-n)}$ represents the personal temporary key, $TK_{G1}$ represents the temporary key shared by the G1 group, $LID_{G1}$ represents a local identity of the G1 group, $ID_{NAP}$ represents the access node identifier of the target access network, $ID_{ANDSF}$ represents an identity identifier of the discovery function module ANDSF, and $LID_{(1-n)}$ represents a local personal identity of a $(1-n)^{th}$ user serial number.

3. The method according to claim 1, wherein in step S208, the message authentication code $XMAC_{AAA/ANDSF}$ is expressed as:

$$XMAC_{AAA/ANDSF} = H(K_{ANDSF\text{-}AAA}, ID_{AAA} \| T_{AAA} \\ \| N_{AAA} \| N_{ANDSF});$$

wherein $XMAC_{AAA/ANDSF}$ represents a message authentication code sent by the target access network AAA to the discovery function module ANDSF, $ID_{AAA}$ represents an identity identifier of the target access network AAA, $T_{AAA}$ represents a third timestamp, wherein the target access network AAA sends the message authentication code $XMAC_{AAA/ANDSF}$ at the third timestamp, and $N_{ANDSF}$ represents a random number of the discovery function module ANDSF;

the message authentication code $MAC_{ANDSF/G1}$ is expressed as:

$$MAC_{ANDSF/G1} = H(GTK_{G1}, \\ LID_{G1} \| N_{AAA} \| N_{LD} \| ID_{NAP} \| T_{ANDSF});$$

wherein $MAC_{ANDSF/G1}$ represents a message authentication code sent by the discovery function module ANDSF to the G1 group, $GTK_{G1}$ represents the group temporary key, $ID_{NAP}$ represents the access node identifier of the target access network, $LID_{G1}$ represents a local identity of the G1 group, and $T_{ANDSF}$ represents the first timestamp.

4. The method according to claim 1, wherein in step S2010, the message authentication code $MAC_{i/LD}$ is expressed as:

$$MAC_{i/LD} = H(TK_{G1}, LID_i \| LID_{G1} \| T_i);$$

wherein $TK_{G1}$ represents the temporary key $TK_{G1}$, and $T_i$ represents a fourth timestamp, wherein each UE sends the message authentication code $MAC_{i/LD}$ at the fourth timestamp;

the session key $SK_{iAAA}$ is expressed as:

$$SK_{iAAA} = H(TK_i \| N_{AAA} \| N_{LD});$$

wherein $TK_i$ represents the personal temporary key, and $N_{LD}$ and $N_{AAA}$ represent the random number $N_{LD}$ and the random number $N_{AAA}$;

the personal local identity $LID_i$ is expressed as:

$$LID_i = TID_i \oplus (N_{LD}, SK_{i\text{-}ANDSF});$$

wherein $SK_{i\text{-}ANDSF}$ represents the shared key of the user equipment $UE_i$ and the discovery function module ANDSF, $TID_i$ represents the personal temporary identity, and $N_{LD}$ represents the random number $N_{LD}$;

the group local identity $LID_{G1}$ is expressed as:

$$LID_{G1} = TID_{G1} \oplus H(N_{LD}, GTK_{G1});$$

wherein $GTK_{G1}$ represents the shared key of the G1 group, $N_{LD}$ represents the random number $N_{LD}$, and H represents a sixth hash function;

the personal temporary key $TK_i$ is expressed as:

$$TK_i = H(SK_{i\text{-}ANDSF} \| N_{LD} \| LID_i)$$

wherein H represents a seventh hash function, $SK_{i\text{-}ANDSF}$ represents the shared key of the user equipment $UE_i$ and the discovery function module ANDSF, $N_{LD}$ represents the random number $N_{LD}$, and $LID_i$ represents the personal local identity;

the temporary key $TK_{G1}$ is expressed as:

$$TK_{G1} = H(GTK_{G1} \| N_{LD} \| LID_{G1});$$

wherein $GTK_{G1}$ represents the shared key of the G1 group, $N_{LD}$ represents the random number $N_{LD}$, and $LID_{G1}$ represents a local identity of the G1 group;

the message authentication code $MAC_{i/LD}$ is expressed as:

$$MAC_{i/LD}=H(TK_{G1},LID_i\|LID_{G1}\|T_i);$$

wherein $TK_{G1}$ represents the temporary key $TK_{G1}$ for users in the G1 group to access the target access network WLAN, $LID_i$ represents the personal local identity of the user equipment $UE_i$, $LID_{G1}$ represents the local identity of the G1 group, and $T_i$ represents the fourth timestamp $T_i$.

5. The method according to claim 1, wherein in step S2011, the message authentication code $MAC_{LD/S-GW}$ is expressed as:

$$MAC_{LD/S-GW}=H(SK_{LD-S-GW},T_{LD}\|N_{LD2});$$

the identity authentication ticket Tic P-GW is expressed as:

$$Tic\ P\text{-}GW=\{LID_{(1-n)}\|LID_{G1}\|T_{LD}\|N_{LD2}\|ID_{NAP}\|H(LID_{(1-n)}\|LID_{G1}\|T_{LD}\|N_{LD2}\|ID_{NAP})\}SK_{LD-P-GW};$$

wherein $ID_{NAP}$ represents the access node identifier of the target access network, $SK_{LD-P-GW}$ represents a pre-shared key of the leader and the packet gateway P-GW, $T_{LD}$ represents the timestamp $T_{LD}$, $N_{LD2}$ represents the random number $N_{LD2}$, $LID_{(1-n)}$ represents a local personal identity of a $(1-n)^{th}$ user serial number, $LID_{G1}$ represents a local identity of the G1 group, and $T_{LD}$ represents the timestamp $T_{LD}$.

6. The method according to claim 1, wherein in step S2014, the message authentication code $MAC_{P-GW/S-GW}$ is expressed as:

$$MAC_{P-GW/S-GW}=H(K_{S-GW-P-GW},N_{LD2}+1);$$

the message authentication code $XMAC_{S-GW/P-GW}$ is expressed as:

$$XMAC_{S-GW/P-GW}=H(K_{S-GW-P-GW},N_{LD2});$$

wherein H represents an eighth hash function, $K_{S-GW/P-GW}$ represents the shared key of the service gateway S-GW and the packet gateway P-GW, and $N_{LD2}$ represents the random number $N_{LD2}$.

7. The method according to claim 1, wherein in step S2021, the message authentication code $MAC_{P-GW/A-GW}$ is expressed as:

$$MAC_{P-GW/A-GW}=H(K_{P-GW-A-GW},N_{A-GW});$$

wherein H represents a ninth hash function, $K_{P-GW/A-GW}$ represents the shared key of the packet gateway P-GW and the WLAN access gateway A-GW, and $N_{A-GW}$ represents the random number $N_{A-GW}$.

8. The method according to claim 1, wherein in step S2023, the message authentication code $MAC_i$ is expressed as:

$$MAC_i=H(TK_i,N_{AAA}\|LID_{G1}\|LID_i);$$

wherein H represents a tenth hash function, $MAC_i$ represents the message authentication code $MAC_i$ aggregated by the user equipment $UE_i$, $TK_i$ represents the personal temporary key $TK_i$, $N_{AAA}$ represents the random number selected by the target access network AAA, $LID_{G1}$ represents a local identity of the G1 group, and $LID_i$ represents the personal local identity of the user equipment $UE_i$.

* * * * *